United States Patent [19]

Allan et al.

[11]  4,059,652

[45]  Nov. 22, 1977

[54] EXTRACTION RESISTANT POLYOLEFIN STABILIZER

[75] Inventors: John Leslie Hugh Allan, Glen Rock, N.J.; John James Roderick, Avon Lake, Ohio

[73] Assignee: Dart Industries Inc., Los Angeles, Calif.

[21] Appl. No.: 677,105

[22] Filed: Apr. 15, 1976

[51] Int. Cl.$^2$ .......................... C08G 8/02; C08G 8/18; C08G 75/16

[52] U.S. Cl. .............................. 260/848; 260/45.95 C; 260/49; 260/823; 260/874

[58] Field of Search ................ 260/49, 848, 823, 874, 260/45.95 C

[56] References Cited

U.S. PATENT DOCUMENTS

| | | |
|---|---|---|
| 2,268,091 | 12/1941 | Niedercorn et al. ............... 260/49 X |
| 2,621,164 | 12/1952 | Nagy ..................................... 260/49 |
| 3,328,489 | 6/1967 | Murdock ........................... 260/49 X |

Primary Examiner—Lester L. Lee
Attorney, Agent, or Firm—Margareta Lemaire; Bryant W. Brennan; Fred S. Valles

[57] ABSTRACT

An extraction resistant, smoke resistant linear polymeric phenolic antioxidant containing sulfonic acid groups or salts thereof in at least a portion of the recurring phenolic ring groups.

14 Claims, No Drawings

EXTRACTION RESISTANT POLYOLEFIN STABILIZER

BACKGROUND OF THE INVENTION

It is well known to stabilize plastics, e.g. olefin polymers, against degradation due to heat and oxidation by incorporating into the polymers a stabilizing amount of hindered phenolic antioxidants. However, such antioxidant stabilizers have not proved entirely satisfactory for many end uses. This is true because of the relative ease with which they can be extracted from the polymers by nongaseous fluids. For example, a plurality of individual plastic insulated wire are encased in plastic tubing to form underground cables. The void spaces within the tubing are filled with a very high viscosity liquid such as petrolatum or petroleum jelly. A serious disadvantage to the use of plastic materials as insulators for this application has been the fact that at least a portion of the stabilizing amount of the antioxidants incorporated into the plastic insulation is extracted into the petrolatum. This causes a rapid deterioration of the insulation due to the combined effects of heat and oxidation.

A prior art solution to this extraction problem involves the use of novolac resins of high molecular weight as primary antioxidants. These thermoplastic resins, which are condensation products of a phenol with an aldehyde, do exhibit much greater extraction resistance than non-polymeric phenolic antioxidant or novolacs of relatively low molecular weight, e.g. those having on the average 20 or less phenolic ring groups in the molecular structure. However, commercialization of these high molecular weight novolacs as stabilizers have not been altogether successful. One reason therefor is that resins stabilized with novolacs in general tend to smoke excessively and even seriously degrade at temperatures often encountered in extrusion of the resin, e.g. in the extrusion of wire or cable coatings.

Another serious disadvantage to the use of plastic materials, e.g. polyolefin resins, as insulation for wire and cables is the fact that the degradation of the polymer is accelerated by the presence of copper and alloys of copper. Prior art methods to solve this problem have resulted in a combination of the polyolefin resin with the primary hindered phenolic antioxidant and a copper deactivator of chelating agent such as organic hydrazide or hydrazine compounds. However, these methods do not solve the problem when the resulting compositions are contacted with petrolatum. In fact, test results have indicated that the deactivation due to copper is often accelerated even further after the polymeric material has been subjected to extraction with petrolatum.

It is therefore a primary objective of this invention to provide a novel hindered phenolic antioxidant compound which exhibits resistance to extraction with hydrocarbons such as petrolatum.

It is another object of the invention to provide a novel extraction resistant stabilized polyolefin composition.

It is a further object to provide a polyolefin composition useful in underground wire and cable applications.

Other objects of the invention will become apparent from the detailed description and appended claims.

THE INVENTION

It has now been found that excellent extraction resistance can be obtained without the aforementioned attending problem of excessive smoking and deterioration, when a polyolefin is stabilized with the novel polymeric phenolic antioxidant described hereinafter. Thus, in accordance with the present invention there is provided a linear polymer which comprises:

0–99 mole percent of the recurring groups A of the formula

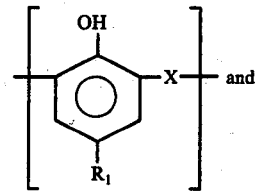 and

1–100 mole percent of the recurring groups B of the formula

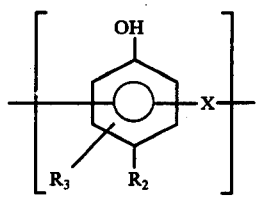

wherein X can be

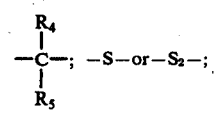

and wherein $R_1$ and $R_2$ is an isomeric alkyl, cycloalkyl, alkaryl or an aryl group of 3 to 20 carbon atoms, $R_3$ is a sulfonic acid group - $SO_3H$ or a salt thereof, $R_4$ and $R_5$ is hydrogen, or an alkyl, cycloalkyl, alkaryl or an aryl group of 1 to 20 carbon atoms.

The polymer is suitably prepared by first sulfonating at least one para substituted phenol under conventional sulfonation conditions, which involves reaction with a concentrated sulfuric acid, oleum, sulfur trioxide or any other known sulfonating agent. The aforementioned para substituted phenol should be one wherein a group $R_2$ as defined above is located in the para position with respect to the hydroxyl group in the ring structure. Examples of suitable phenols include isopropyl phenol, p-t-butyl phenol, p-t-amyl phenol, p-t-octyl phenol, p-t-dodecyl phenol, p-phenyl phenol and the like.

The sulfonated phenol is then reacted with a reactant such as an aldehyde, a ketone, sulfur monochloride or sulfur dichloride. Examples of suitable aldehydes and ketones include formaldehyde, acetaldehyde, propionylaldehyde, butylaldehyde, benzaldehyde, tolualdehydes, furfuraldehyde, acetone, methyl ethyl ketone, methyl propyl ketone, diethyl ketone, etc. This second reaction can be carried out optionally in the presence of one or more unsulfonated para substituted phenols. The latter may be the same or different from the para substituted phenol or phenols used in preparing the sulfonated phenolic reactant. The reaction is a condensation reaction, resulting in the formation of a linear polymer (novolac) and, depending on the reactant used, either water or hydrogen as by-products.

When the desired final reaction product is one containing a proportion of unsulfonated para substituted phenol groups and the sulfonated phenol is derived from the same species of unsulfonated phenol, the first reaction is suitably carried out by sulfonation with less than a stoichiometric amount of sulfonation agent to obtain a mixture of unsulfonated and sulfonated phenol in the desired proportions.

The reactants are supplied to the second reaction such that the molar ratio of the phenol linking reactant (i.e., aldehyde, ketone, etc.) to the total phenols (sulfonated and unsulfonated) is at least 0.7:1 and preferably between about 0.9:1 to 1.5:1. With low ratios there results a polymer of relatively low molecular weight, while relatively high molecular weight polymers are obtained at the high ratios. Theoretically, in an ideal reaction system a 1:1 ratio of reactants should be sufficient to produce a polymer of very high chain lengths. In practice, however, some of the linking reactant may not enter into the reaction, e.g. it may be lost or entrapped in the equipment due to high volatility, or may undergo side reactions. Therefore, when high molecular weight products are desired, a ratio of above 1:1 may be required, although the ratio can vary considerably depending upon the efficiency of the particular reaction system used.

Inasmuch as the sulfonated phenol in itself provides the acidity necessary to catalyze the reaction, no further addition of acid catalyst is necessary. The reaction is suitably carried out at ambient pressure and at moderate temperatures, e.g. in the range of about 80°–130° C after which the by-product water or hydrogen chloride is removed by distillation at higher temperatures such as 200°–250° C and preferably at subatmospheric pressure.

If desired, the sulfonic acid groups of the polymer product can be partially or completely neutralized with an inorganic or organic base, such as an amine, ammonia or a hydroxide, carbonate or bicarbonate of an alkali metal or alkaline earth metal. Examples of suitable bases in addition to ammonia include dimethyl amine, trimethyl amine, diethyl amine, triethyl amine, diphenyl amine, triphenyl amine, sodium hydroxide, potassium hydroxide, calcium hydroxide, lithium hydroxide, sodium carbonate, potassium carbonate, sodium bicarbonate, and many others. The resulting salts are preferably prepared by treating the sulfonated condensation polymer with any of the aforementioned bases after the distillation step to remove the condensation reaction by-products and unreacted compounds. However, it is entirely feasible, especially when only partial salts are to be prepared, to carry out the partial neutralization after the sulfonation step but prior to the condensation step, whereby the acidity needed to catalyze the reaction is provided by the remaining non-neutralized sulfonic acid groups. It is, of course, also possible to completely neutralize the sulfonated phenol and then carry out the condensation reaction in the presence of added acid catalyst.

The degree of polymerization, i.e. the average number of phenolic rings in the molecule chain, have little, if any, significance in the invention, i.e. both increased extraction resistance and smoke resistance are obtained regardless of molecular weight of the compounds of the invention. The degree of improvement in extraction resistance is more pronounced, however, with the sulfonated low molecular weight compounds than with high molecular weight compounds, as considerable extraction resistance is already a feature of the unsulfonated high molecular weight compounds due to bulkiness of the molecules. Since it was surprisingly found that the presence of only a very small proportion of sulfonic acid groups or sulfonic acid salt groups is necessary to significantly improve the extraction resistance over that of a similar unsulfonated compound, and since this proportion does not materially change the molecular weight, the improvement cannot be explained by reason of increase in size of the molecule by the modifying groups. Whatever the actual reason for the improvement may be, e.g. the ionic nature of the modifying groups, the fact still remains the extraction resistance and smoke resistance are increased considerably. In addition, compositions stabilized with the antioxidants of this invention have excellent dielectric properties.

The polyolefin base resin to be stabilized with the primary antioxidant of this invention comprises solid, substantially crystalline polyolefins including homopolymers and copolymers of $\alpha$-olefins having 2 to 8 carbon atoms and blends thereof. Among the preferred polyolefins are the polypropylene based resins containing at least 60 percent by weight preferably at least 75 percent polymerized propylene groups. Especially preferred resins are the ethylene-propylene polymer resins, such as random or block copolymers of ethylene and propylene, blends of homopolymers of propylene and ethylene, and various combinations thereof, wherein the ethylene in either homo-or copolymerized state accounts for from about 2 to about 25 percent by weight of the total resin and more preferably from about 3 to about 15 percent.

Generally, the hindered phenolic antioxidant of this invention is added in quantities of about 0.01 to about 5 percent by weight based on the weight of the polyolefin.

When the stabilized polyolefin composition is to be used to insulate copper and copper alloy wires it is customary also, to include a metal deactivator or chelating agent often referred to as a secondary stabilizer. Preferably, the secondary stabilizer should be one of the well known organic hydrazide or hydrazine compounds commonly used for this specific purpose, e.g. the compounds disclosed in U.S. Pat. Nos. 3,438,935; 3,484,285; 3,660,438; 3,752,865 and 3,772,245, all incorporated herein by reference. When used, the secondary stabilizers are added in quantities sufficient to provide a concentration of from about 0.01 to about 5 percent based on the weight of the polyolefin.

It is also contemplated to incorporate a thioester synergist such as dilauryl thiodipropionate (DLTDP) or distearylthiodipropionate (DSTDP) into the polyolefin composition, usually in amounts not exceeding 1.5 percent, preferably in the range of about 0.5 to 1.3 percent based on the total weight of the composition.

In addition, the compositions of this invention can also contain other optional ingredients such as ultraviolet stabilizers, pigments, delustrants, plasticizers, flame retardant materials, anti-static agents, processing aids, and any other additive which is known in the art to impart a particular property to the composition for a particular application.

In order to provide a better understanding of the invention, reference is had to the following examples, which are to be considered only as illustrative but not a limitation of the invention.

EXAMPLES 1-3

Two antioxidants (A and B) according to the invention and one control composition (C) were prepared as follows:

103 grams of tertiary para octyl phenol was partially sulfonated by heating to 95° C with 0.2 grams concentrated sulfuric acid (98%) under an atmosphere of nitrogen with agitation. 40.6 grams of formalin solution (37%) was then added and the mixture was refluxed for 2 hours. After addition of 100 cc of xylene, a water-xylene azeotropic was distilled from the mixture at a temperature up to 140° C and at ambient pressure. The pressure was then gradually reduced to 1.5 torr, and the stripping continued up to a temperature of 225° C. The mixture was then cooled to obtain a solid novolac product (Composition A).

Composition B was prepared following the above procedure and then heating the resulting product to 190° C and adding 0.3 grams triethylamine with agitation. Heating and stirring was then continued under reflux for 15 minutes with the temperature rising to 230° C, and the resulting trialkylamine salt product was then cooled.

Control Composition C was made according to the procedure for making Composition A except that the sulfonation step was omitted, i.e. the aqueous formalin solution was now added to the tertiary para octyl phenol prior to the addition of the sulfuric acid, which in this case acts merely as the catalyst for the reaction.

EXAMPLE 4–6

97 parts by weight of an ethylene-propylene copolymer containing 11.3 wt.% ethylene was compounded in a Brabender at 190° C for 5 minutes with 2 parts of Composition A and 1 part of N-salicylidene, N'-salicyl hydrazide, a metal chelating agent.

Two other blends were made as above except that Composition A was omitted and Compositions B and C were respectively added instead.

Each of the blends were then compression molded into 6 × 6 inches × 10 mil. plaques at 400° F and 25,000 psig for 60 seconds. The plaques were rapidly cooled at high pressure and cut into 1½ × 1½ inches × 10 mil. strips. One set of strips was submerged in U.S.P. Grade petrolatum at 86° ± 1° C for 18 hours. The strips were removed from the petrolatum, wiped clean tested using differential scanning calorimetry (DSC). This analysis provides an extremely effective method for obtaining accelerated aging data which can be extrapolated to periods of decades at ambient temperatures.

The DSC test procedure set forth below was followed:

A small sample of the 10 mil. film strip prepared in the compression mold having a diameter of approximately 0.25 inches is placed on a copper test pan in a Perkin-Elmer differential scanning calorimeter (DSC). The pan is then covered and heated from room temperature at a linear programmed rate of 10° C/min. in the presence of nitrogen flowing through the DSC at a rate of 0.08 cu. ft. per hour. When the temperature in the DSC reaches 200° C, the nitrogen is automatically stopped and oxygen flowing at the same rate is passed through the DSC. The temperature is maintained at 200° C until the oxidation peak has occurred and the induction period is measured in minutes from the time the oxygen is added until the oxidative degradation occurs.

The test results are shown in Table I.

TABLE I

| | | DSC Stability | | |
|---|---|---|---|---|
| | | DSC - Minutes | | |
| Examples | Primary Stab. | Before Extr. | After Extr. | % Retention of Stability |
| 4 | A (sulfonated) | 47 | 42 | 89 |
| 5 | B (sulfonated salt) | 43 | 37 | 86 |
| 6 | C (unsulfonated) | 42 | 9 | 21 |

As seen from the above data, incorporation of the antioxidants of this invention containing small amounts of either sulfonic acid or sulfonic acid salt groups increases the extraction resistance to over 400 percent of that obtained with an unsulfonated antioxidant.

EXAMPLES 7–9

To evaluate the smoke resistance of Composition A and B a thermal gravimetric analysis (TGA) method was followed in which weighed samples of each of these compositions were heated at a rate of 10° C per minute to 260° C in a nitrogen atmosphere and then maintained at 260° C for 30 minutes. The weight loss of each sample was determined during the heating period at 100, 150, 200 and 260° C and thereafter at 15 minute intervals.

As control, a test was also made with a commercially available unsulfonated t-butyl-t-octyl phenol acetaldehyde novolac resin of about the same extraction resistance as that of Compositions A and B.

The results of the tests are shown in Table II.

TABLE II

| | | Thermal Gravimetric Analysis - % Weight Loss | | | | | |
|---|---|---|---|---|---|---|---|
| Example | Composition | 100° C | 150° C | 200° C | 260° C | 260° C 15' | 260° C 30' |
| 7 | A | 0 | 0 | 0 | 0.05 | 0.98 | 1.50 |
| 8 | B | 0 | 0 | 0 | 0.17 | 1.10 | 1.63 |
| 9 | Control | — | 0.46 | 2.44 | 1.18 | 38.0 | 49.0 |

The presence of sulfonic acid or sulfonic acid salt group in the novolac antioxidants has the effect of almost completely retarding the smoking and degradation of the compositions, while the control lost about 50% of its weight evolving heavy smoke fumes.

EXAMPLES 10–12

The stabilized propylene copolymer compositions of Examples 4 and 5 were tested using ASTM D-150-64T and found to have the properties set forth in Table III:

TABLE III

| | Electrical Properties | | |
|---|---|---|---|
| Resin | Unstabilized Propylene Copolymer | Example 4 | Example 5 |
| Dielectric Constant at: | | | |
| 100 cps | 2.10 | 2.10 | 2.14 |
| 1000 cps | 2.09 | 2.10 | 2.13 |
| 1,000,000 cps | 2.10 | 2.10 | 2.14 |
| Dissipation Factor at: | | | |
| 100 cps | 0.00055 | 0.00068 | 0.00060 |
| 1000 cps | 0.00058 | 0.00071 | 0.00060 |
| 1,000,000 cps | 0.00040 | 0.00060 | 0.00040 |

The conclusion that incorporation of either one of stabilizers A or B into the propylene copolymer has no significant effect on the electrical properties is an especially important factor in wire and cable applications.

What is claimed is:

1. An extraction resistant polymer composition which comprises:

a major proportion of the recurring groups A of the formula

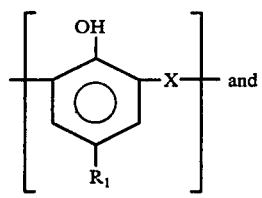

and a minor proportion of the recurring groups B of the formula

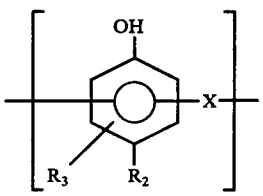

wherein
X can be

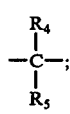

- S - or --S$_2$-;
and wherein

R$_1$ and R$_2$ is a branched alkyl, cycloalkyl, alkaryl or an aryl group of 3 to 20 carbon atoms, R$_3$ is a sulfonic acid group - SO$_3$H or a salt thereof, R$_4$ and R$_5$ is hydrogen, or an alkyl, cycloalkyl, alkaryl or an aryl group of 1 to 20 carbon atoms; which polymer composition is prepared by reacting under acidic conditions A. a mixture of a major proportion of at least one phenol of the formula

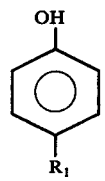

and a minor proportion of at least one phenol of the formula

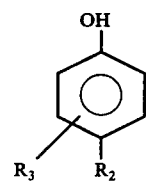

B. with at least about 0.7 moles of a compound selected from the group consisting of aldehydes, ketones, sulfur monochloride and sulfur dichloride per mole of total phenols in the mixture of A.

2. A composition according to claim 1 wherein R$_1$ and R$_2$ each are tertiary alkyl groups.

3. A composition according to claim 2 wherein R$_1$ and R$_2$ is t-octyl.

4. A composition according to claim 1 wherein the R$_1$ radical of a portion of the recurring groups A is dissimilar to the R$_1$ radical of another portion of said recurring groups A.

5. A composition according to claim 1 wherein the R$_1$ radical of a portion of the recurring groups B is dissimilar to the R$_1$ radical of another portion of said recurring groups B.

6. A composition according to claim 1 wherein R$_3$ is a sulfonic acid group.

7. A composition according to claim 1 wherein R$_3$ is a sulfonic acid salt group.

8. A composition according to claim 7 wherein the sulfonic acid salt group is a trialkyl ammonium salt.

9. A 2-8 carbon atom α - olefin polymer containing from about 0.01 to about 5 percent by weight of the polymer of claim 1.

10. The olefin polymer resin composition of claim 9 wherein the olefin polymer is selected from homopolymers and copolymers of α-olefins having 2 to 8 carbon atoms, and mixtures thereof.

11. The olefin polymer resin composition of claim 10 wherein the olefin polymer is a propylene polymer.

12. The olefin polymer resin composition of claim 11 wherein the propylene polymer is an ethylene-propylene polymer resin containing from about 2 to about 25 percent by weight polymerized ethylene groups.

13. The olefin polymer resin composition of claim 9 containing from about 0.01 to about 5 percent by weight of a metal chelating agent.

14. The polymer composition of claim 1, wherein the mole ratio of the compound of B to that of the mixture of (A) is maintained between about 0.9:1 and about 1.5:1.